United States Patent
Palmer

(10) Patent No.: US 6,745,896 B2
(45) Date of Patent: Jun. 8, 2004

(54) DVD SLEEVE

(75) Inventor: Christopher G. Palmer, Fremont, CA (US)

(73) Assignee: The Laserline Company, Norwalk, CT (US)

( * ) Notice: Subject to any disclaimer, the term of this patent is extended or adjusted under 35 U.S.C. 154(b) by 12 days.

(21) Appl. No.: 10/059,471

(22) Filed: Jan. 29, 2002

(65) Prior Publication Data

US 2002/0197098 A1 Dec. 26, 2002

Related U.S. Application Data

(60) Provisional application No. 60/274,143, filed on Mar. 8, 2001, and provisional application No. 60/264,874, filed on Jan. 29, 2001.

(51) Int. Cl.⁷ .............................................. B65D 85/57
(52) U.S. Cl. ...................... 206/312; 206/232; 206/484
(58) Field of Search .............................. 206/308.1, 232, 206/307, 309, 310–313, 425, 484, 449; 281/31, 38; 402/79

(56) References Cited

U.S. PATENT DOCUMENTS

| | | |
|---|---|---|
| 4,549,658 A | 10/1985 | Sfikas |
| 4,620,630 A | 11/1986 | Moss |
| 4,623,062 A | 11/1986 | Chase et al. |
| 4,629,070 A | 12/1986 | Roberg |
| 4,850,731 A | 7/1989 | Youngs |
| 5,048,681 A | 9/1991 | Henkel |
| D323,930 S | 2/1992 | Ozeki |
| D324,767 S | 3/1992 | Ozeki |
| D325,816 S | 5/1992 | Ozeki |
| D325,817 S | 5/1992 | Call |
| D329,943 S | 10/1992 | Laszlo |
| 5,199,743 A | 4/1993 | Rosinski, III |
| 5,207,717 A | 5/1993 | Manning |
| 5,263,581 A | 11/1993 | Rosen |
| 5,396,987 A | 3/1995 | Temple et al. |
| 5,462,160 A | 10/1995 | Youngs |
| 5,466,008 A | 11/1995 | Ozeki |
| 5,501,540 A | 3/1996 | Ho |
| 5,588,528 A | * 12/1996 | Ozeki ...................... 206/308.1 |
| 5,620,271 A | 4/1997 | Bergh et al. |
| 5,662,218 A | 9/1997 | Ladwig |
| 5,669,491 A | 9/1997 | Pettey |
| 5,692,607 A | 12/1997 | Brosmith et al. |
| 5,713,683 A | * 2/1998 | Bergh et al. .................. 402/79 |
| 5,725,093 A | 3/1998 | Yamaguchi et al. |
| 5,788,075 A | 8/1998 | Wrabel |
| 5,806,894 A | 9/1998 | Dottel |
| D411,402 S | 6/1999 | Udwin et al. |
| 6,019,219 A | 2/2000 | Takahashi |
| 6,019,539 A | 2/2000 | Lynton |
| D421,869 S | 3/2000 | Drew et al. |
| D426,099 S | 6/2000 | Udwin et al. |
| D426,417 S | 6/2000 | Young |
| D428,297 S | 7/2000 | Drew et al. |
| 6,109,432 A | 8/2000 | Pozzoli |
| D431,408 S | 10/2000 | Drew et al. |
| 6,139,210 A | 10/2000 | Nelson et al. |
| D434,262 S | 11/2000 | Bergh et al. |
| D435,188 S | 12/2000 | O'Mallane |
| 6,164,859 A | 12/2000 | Hambright |
| 6,186,320 B1 | 2/2001 | Drew |

FOREIGN PATENT DOCUMENTS

FR       1194784       4/1958

* cited by examiner

*Primary Examiner*—Luan K. Bui
(74) *Attorney, Agent, or Firm*—St. Onge Steward Johnston & Reens LLC

(57) ABSTRACT

A sleeve for storing an data storage device and associated documentation including a generally sheet-like body having a first side and a second side, and a storage area coupled to the first side of the body. The storage area is sized and shaped to receive the documentation therein. The sleeve further includes a pocket coupled to the first side of the body, the pocket being sized and shaped to receive the data storage device therein.

10 Claims, 9 Drawing Sheets

DVD SLEEVE

This application claims priority to U.S. Provisional Application Serial No. 60/264,874, filed Jan. 29, 2001 and U.S. Provisional Application Serial No. 60/274,143, filed Mar. 8, 2001. The contents of both these applications is hereby incorporated by reference.

The present invention is directed to a sleeve for storing a DVD and its associated documentation.

BACKGROUND OF THE INVENTION

Digital video disks ("DVDs") are a widely used medium for digitally storing data, such as films, movies, documents, and other information. Commercially sold DVDs typically include the a rigid outer casing which stores the DVD, along with a label, booklet, pamphlet, supporting documentation, or the like (together, termed "documentation" herein). Thus, there is a need for a device for storing a DVD and its associated documentation, as well as a device for storing a large number of DVDs and their associated documentation.

SUMMARY OF THE INVENTION

In one embodiment, the present invention is a sleeve for storing a DVD and its associated documentation. In another embodiment, the invention is a booklet for storing a plurality of sleeves, each sleeve being shaped to store a DVD and its associated documentation.

In one embodiment, the invention is a sleeve for storing an data storage device and associated documentation including a generally sheet-like body having a first side and a second side, and a storage area coupled to the first side of the body. The storage area is sized and shaped to receive the documentation therein. The sleeve further includes a pocket coupled to the first side of the body, the pocket being sized and shaped to receive the data storage device therein.

Other objects and advantages of the present invention will be apparent from the following description and the accompanying drawings.

DETAILED DESCRIPTION

Figure 1:
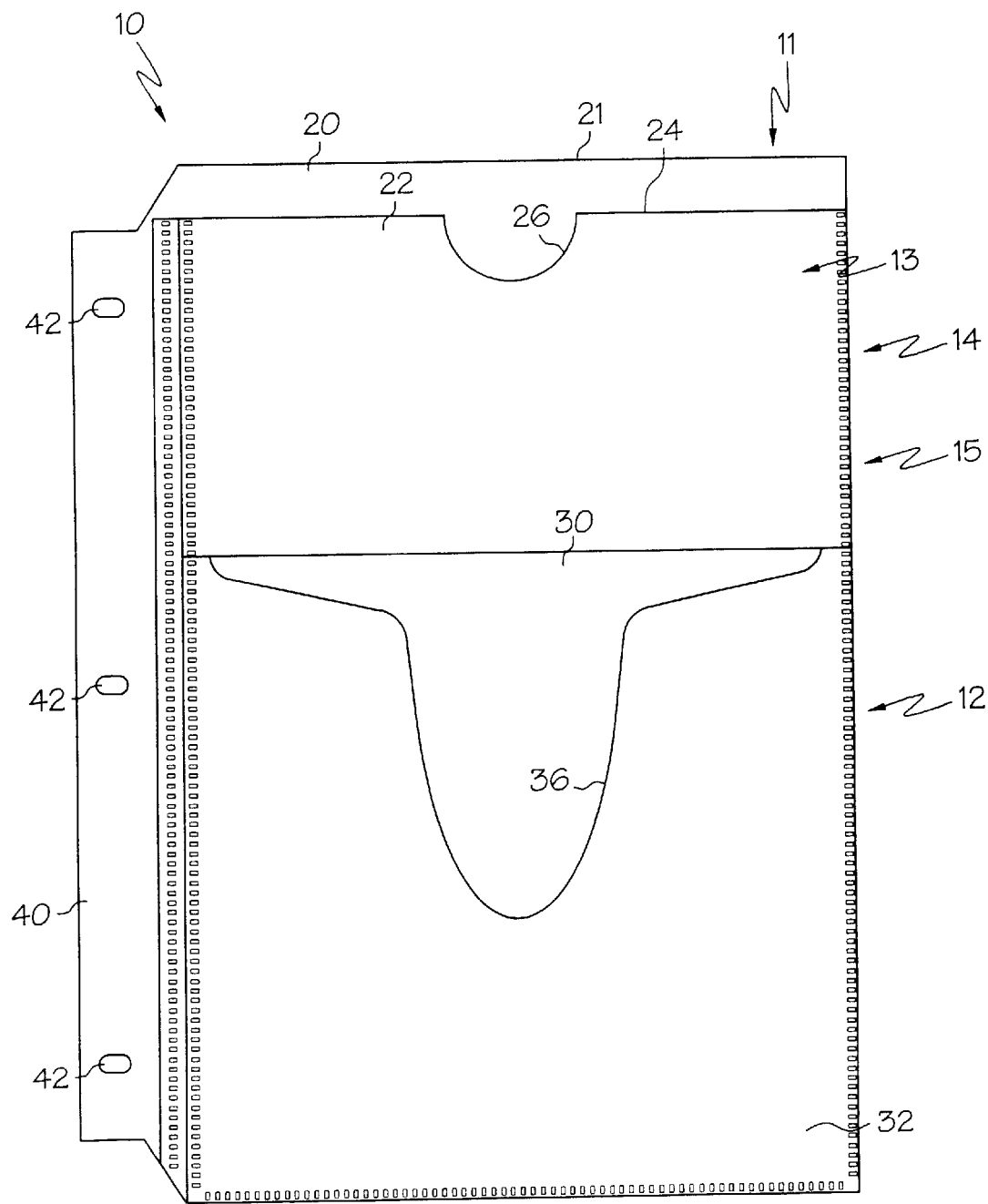
FIG. 1 is a front view of one embodiment of the sleeve of the present invention.

As best shown in FIGS. 1–4, one embodiment of the present invention is a sleeve, generally designated 10, which includes a generally sheet-like body 11 having a first or front side 13 and a second or rear side 15 (the rear side 15 not shown in FIGS. 1–4). The body 11 may include a lower pocket 12 coupled to the front side 13, the lower pocket 12 being shaped to closely receive a data storage device, such as a DVD 16 therein (see FIGS. 2 and 3). For example, a DVD 16 typically has a diameter of about 4¾", and the lower pocket 12 is preferably sized to closely receive the DVD 16 therein. In the illustrated embodiment the lower pocket 12 may be generally rectangular and have dimensions of about 5⅛" (width)×4⅞" (height).

Figure 2:
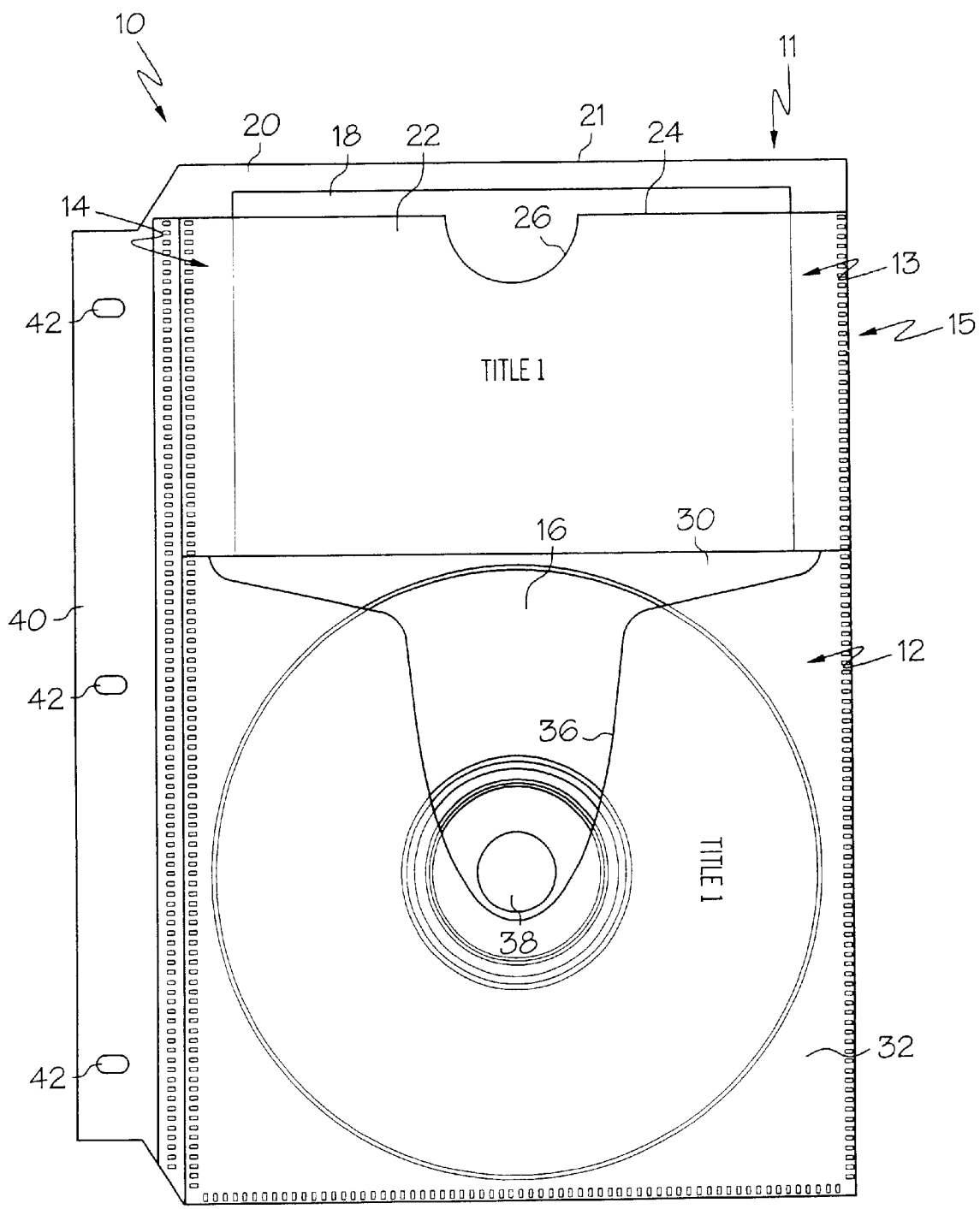
FIG. 2 is a front view of the sleeve of FIG. 1, shown receiving a DVD and associated documentation therein.
Figure 3:
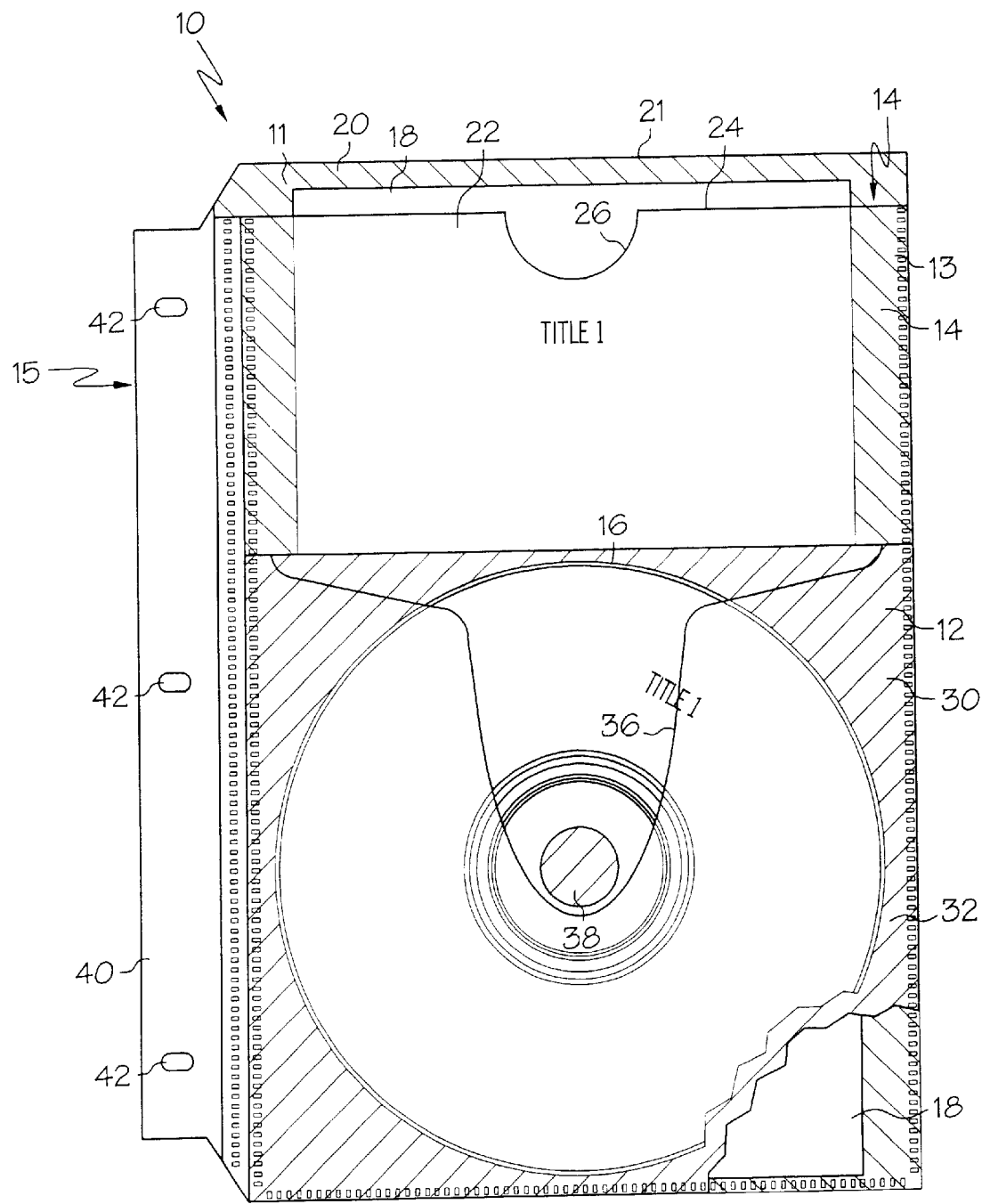
FIG. 3 is a front, partial cut-away view of the sleeve, DVD and documentation of FIG. 2, with the lower and upper backing portions shaded differently to show the arrangement of those components.
Figure 4:
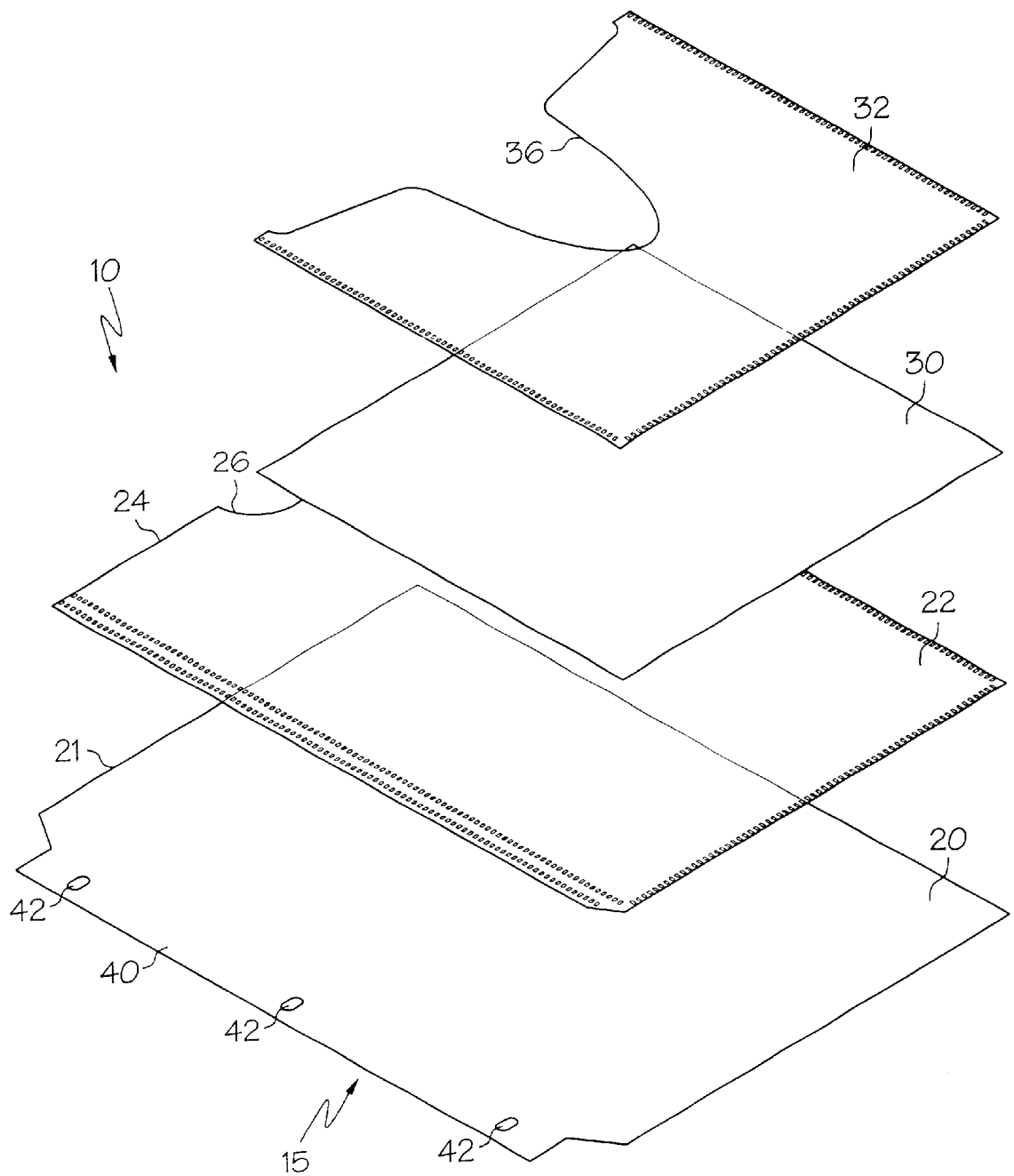
FIG. 4 is an exploded view of the sleeve of FIG. 1.

The body 11 may also include an upper pocket or storage area 14 coupled to the front side 13 of the body 11, the upper pocket 14 being shaped to closely receive printed material such as a label, booklet, pamphlet, booklet, liner notes, supporting documentation, or the like (generally designated 18) therein. The upper pocket 14 preferably extends about the entire height of the sleeve 10 and is preferably sized to receive a standard-sized documentation 18 sold with commercially available DVDs 16. For example, documentation 18 may have dimensions of about 4⅞" (width)×7 5/16" (height) and the upper pocket 14 may have dimensions of about 5⅛" (width)×7¼" (height) so that the upper pocket 14 can closely receive the documentation 18 therein. As shown in FIGS. 2 and 3, the upper pocket 14 may be sized such that the upper portion of the documentation 18 protrudes slightly beyond the upper edge 24 of the upper pocket 14.

The lower pocket 12 may be located on top of the upper pocket 14, and preferably does not fully overlap the upper pocket 14 such that the upper portion of the upper pocket 14 remains exposed. The lower pocket 12 and upper pocket 14 may both have approximately the same widths, but the upper pocket 14 may have a height greater than the height of the lower pocket 12. In this manner, the upper pocket 14 has a greater surface area or footprint than the surface area or footprint of the lower pocket 12.

The sleeve 10 may include an upper backing portion 20 that preferably extends the entire height of the sleeve 10. The upper backing portion 20 can be made from a wide variety of materials, including a non-woven (i.e., spunbound) fabric, such as polypropylene. The sleeve 10 may also include an upper sheet or upper sheet portion 22 facing the upper backing portion 20 such that the upper sheet 22 and upper backing portion 20 at least partially define the upper pocket 14 therebetween. The upper sheet 22 can be made from a variety of materials, preferably a clear or transparent flexible material (i.e., 0.005" thick polypropylene). The upper sheet 22 may be coupled to the upper backing portion 20 at least partially along the sides of the upper backing portion 20, and optionally along the bottom of the upper backing portion 20, to form the upper pocket 14 therebetween. The upper sheet 22 may be coupled to the upper backing portion 20 by any of a variety of attachment methods, including but not limited to sonic welding, stake welding or stitching. The upper edge 24 of the upper sheet 22 may be slightly spaced away from the upper edge 21 of the upper backing portion 20, and may include a generally semicircular notch 26 formed therein.

The sleeve 10 may include a lower backing portion 30 located adjacent to or on top of the upper sheet 22. The lower backing portion 30 can be made from a variety of materials, preferably a soft, non-woven (i.e. spun bound) fabric, such as polypropylene. The lower backing portion 30 may be located on top of and coupled to the upper sheet 22 by a variety of methods, such as welding or adhesives. Alternately, the upper sheet 22 may have its lower extent removed (not shown) and, in this case, the lower edge of the upper sheet 22 may be coupled to the upper edge of the lower backing portion 30.

The sleeve 10 may include a lower sheet 32 are located on top the lower backing portion 30. The lower sheet 32 can be made from a variety of materials, preferably a clear or transparent material (i.e., 0.005" thick polypropylene). The upper edge of the lower sheet 32 may includes a "plunging neckline" shape including a central U-shaped recess 36. The bottom and sides of the lower sheet 32 may be couple to the lower backing portions 30 to form the lower pocket 12 therebetween. The lower sheet 32 may be coupled to the lower backing portion 30 by sonic welding, stake welding, stitching, or various other methods. FIG. 3 illustrates the lower backing portion 30 and the upper backing portion 20 with different shading for illustrative purposes. In particular, the lower backing portion 30 of FIG. 3 includes upwardly-angled diagonal lines (in a left-to-right direction) and the upper backing portion 20 includes downwardly-angled lines (in a left-to-right direction).

As noted above, the upper sheet 22 is preferably transparent, which enables the upper extent of the contents of the upper pocket 14 to remain visible, as shown in FIGS. 2 and 3. The notch 26 is shaped and located to expose a top edge of documentation 18 received in the upper pocket 14 to improve the ease of adding or removing materials from the upper pocket 14.

The lower pocket 12 is preferably sized and shaped to closely receive a standard-sized DVD 16 therein. The lower backing portion 30 is preferably made of a soft material, such as non-woven spunbound fabric to protect the readable/writable surface of the DVD 16. The lower sheet 32 is preferably transparent enable the user to view the labeled surface of the DVD 16 that is received in the lower pocket 12. The recess 36 of the lower sheet 32 is preferably located such that the central opening 38 of a DVD 16 received in the lower pocket 12 is exposed so that the central opening 38 can be accessed during removal of the DVD 16.

As shown in FIGS. 2 and 3, the sleeve 10 can receive a DVD 16 in the lower pocket 12 and documentation 18 associated with the DVD 16 in the upper pocket 14. Furthermore, both the upper portion of the documentation 18 and the printed surface of the DVD 16 are simultaneously visible. Thus, the sleeve 10 enables the user to view the label 18 and the associated DVD 16 at a single glance.

Figure 5:
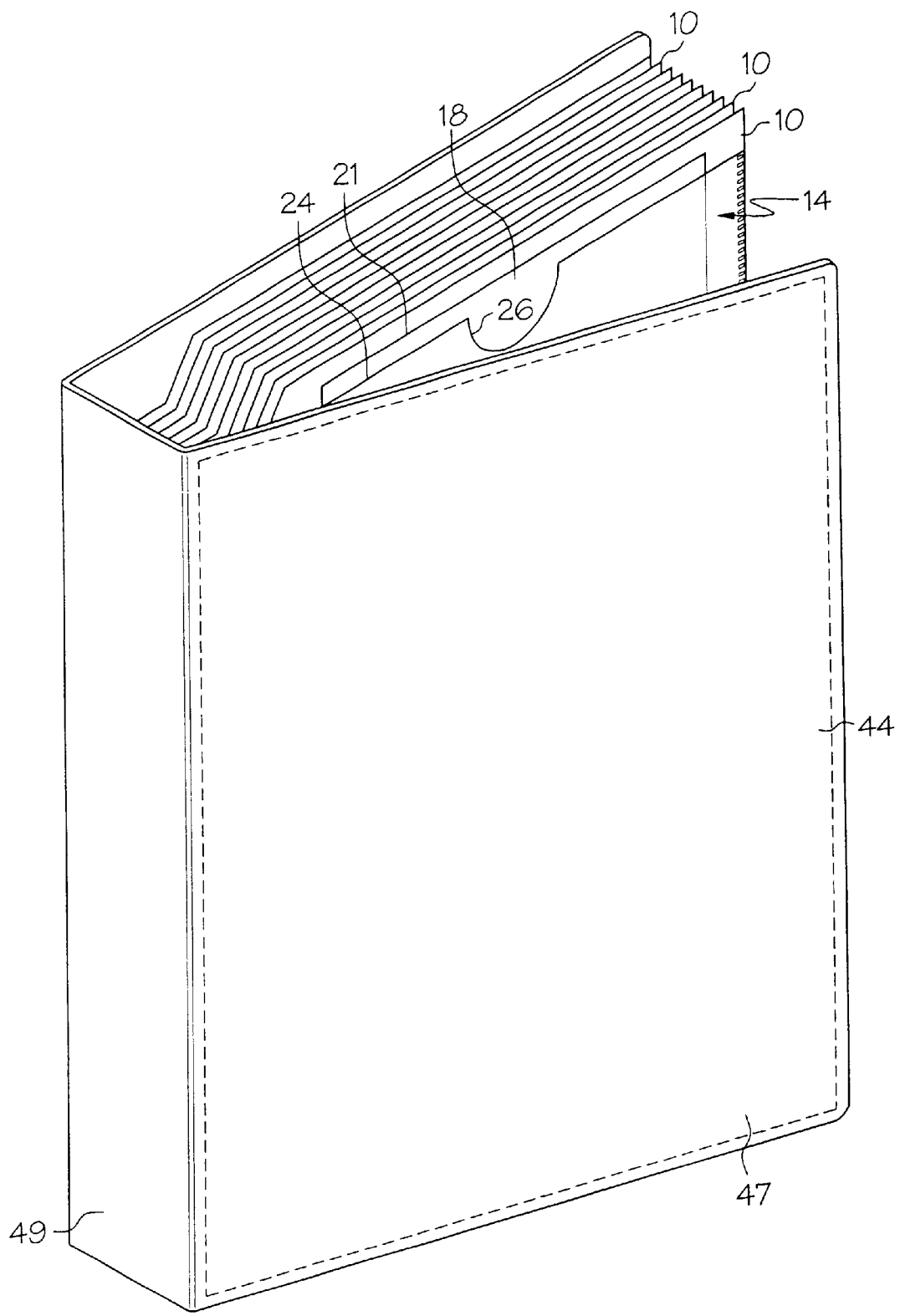
FIG. 5 is a front view of a binder including a plurality of sleeves therein.

The sleeve 10 may include a spine 40 with a set of holes 42 extending therethrough. Each hole 42 is preferably shaped and sized to receive a set of rings from a binding mechanism (not shown) therethrough to removably couple the sleeve 10 to a binder 44, as shown in FIG. 5. As shown in FIG. 5, a plurality of sleeves 10 may be bound in the binder 44, and the binder 44 provides a convenient carrying case for storing a large number of DVDs 16 and associated labels 18. The binder 44 may have an outer cover 47 including a spine 49 and a binding mechanism, such as a three-ring binder, coupled to the spine 49. Of course, the sleeve 10 may include a wide variety of other structures for binding the sleeve to a binder or booklet 44, such as various arrangements of holes, brackets, clips, hook-and-loop fasteners, etc.

Besides the lower 12 and upper 14 pockets on the front side 13 of the body 11, the sleeve 10 may also include a rear lower pocket 12 and a rear upper pocket 14 on the rear side 15 of the body 11 (not shown). In this case, the rear side 15 of the sleeve 10 appears identical to the front side 13 shown in FIGS. 1–3. Furthermore, the backing portion 20 may serve as the upper backing portion for both the front 13 and rear 15 sides of the pocket. When a plurality of sleeves 10 are bound in a binder 44, as shown in FIG. 5, and the sleeves 10 are two-sided (i.e., include pockets 14, 16 on both the front 13 and rear 15 surfaces), a user can simultaneously view two opposed sleeves 10, and therefore simultaneously view two labels 18 and two DVDs 16 while browsing through a binder 44.

Figure 6:
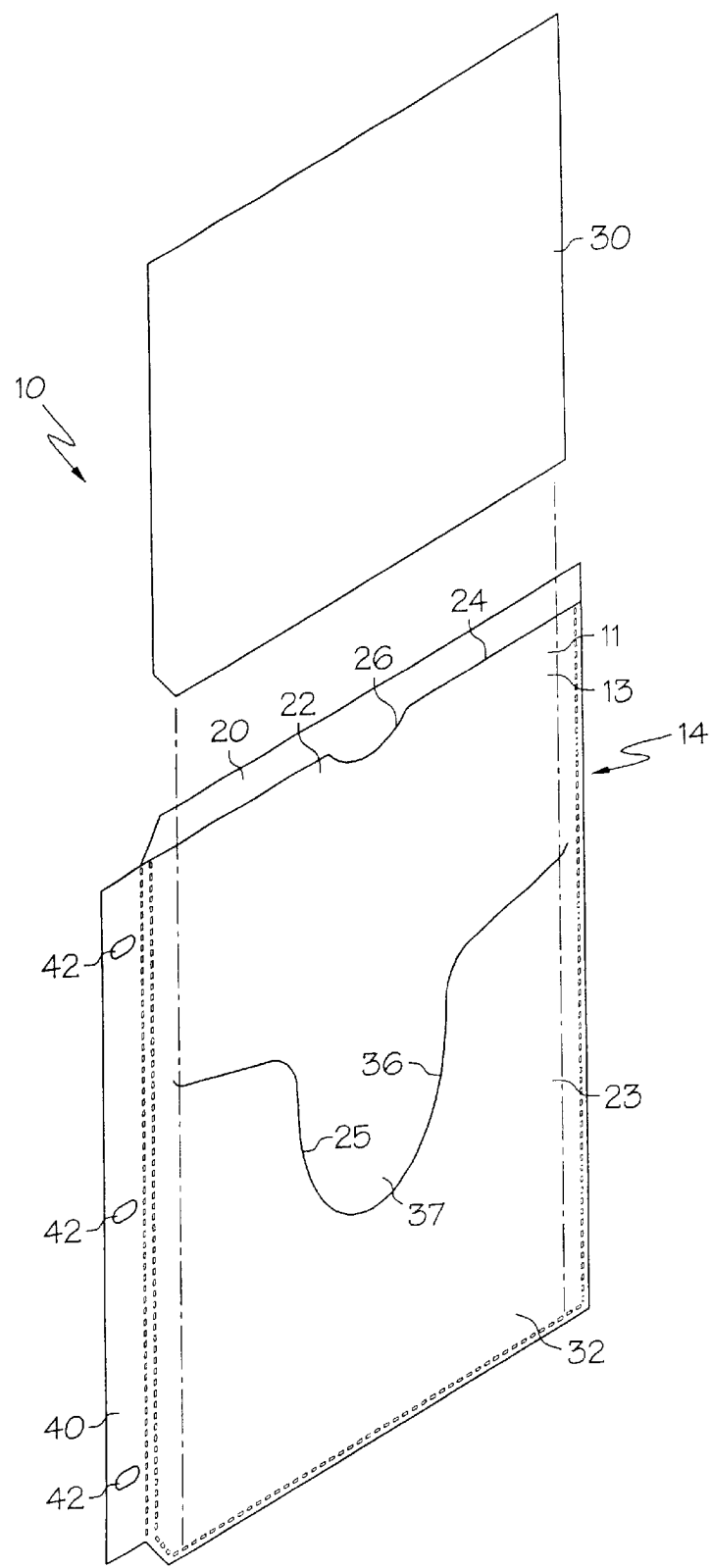
FIG. 6 is a front, partially exploded view of an alternate embodiment of the sleeve of the present invention.
Figure 7:
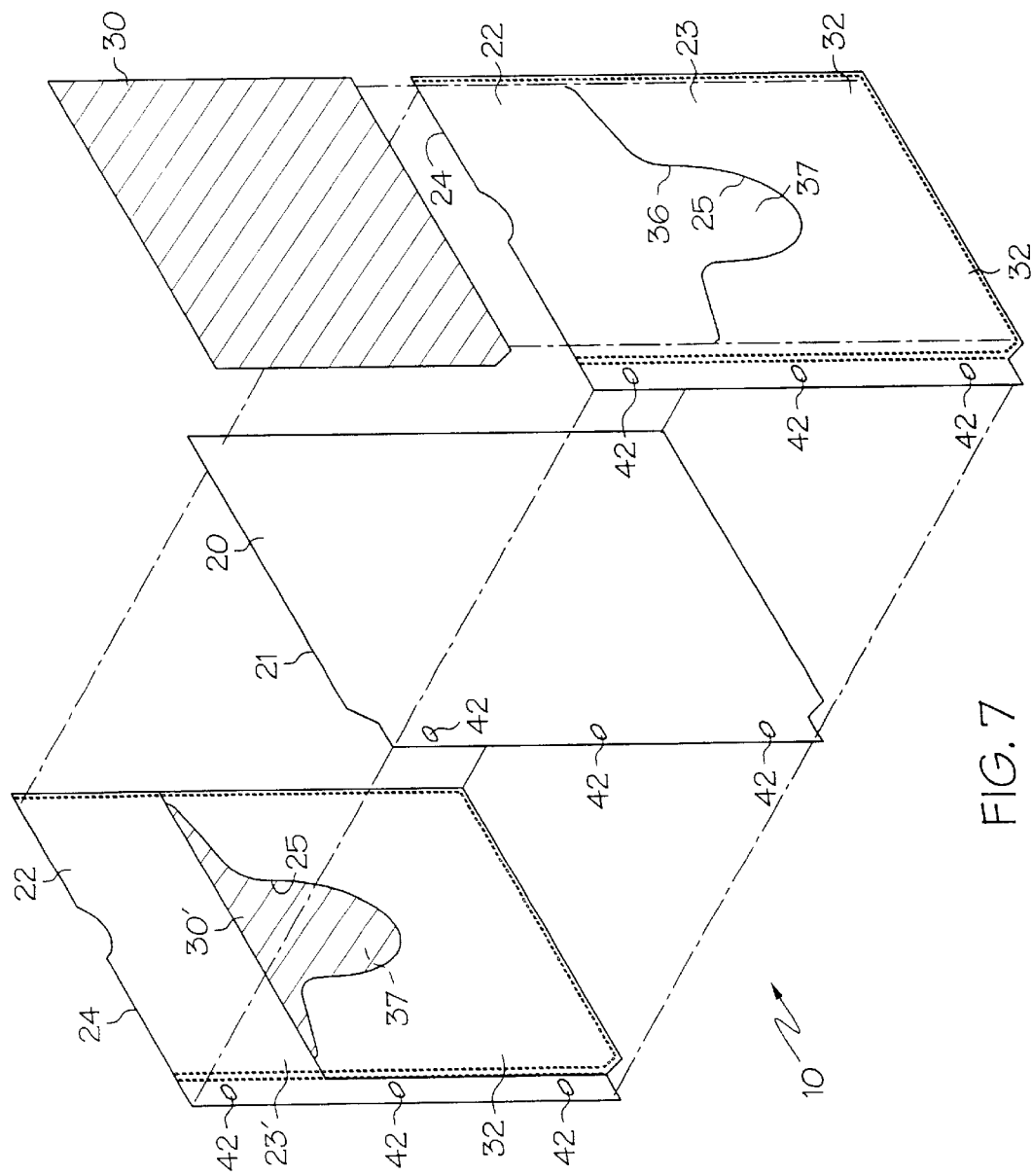
FIG. 7 is an exploded view of the sleeve of FIG. 6, with the lower backing portion being shaded to illustrate how the lower backing portion fits into the piece of material.

As shown in FIGS. 6 and 7, in one embodiment, the upper 22 and lower 32 sheets are formed from a single piece of material 23 (i.e., a piece of transparent polypropylene). The piece of material 23 may include a slit 25 cut therein to form the recess 36, which thereby creates a flap 37. The slit 25 essentially divides the piece of material 23 into the upper 22 and lower 32 sheets.

Once the slit 25 is cut in the piece of material 23, the lower backing portion 30 is slid through the slit 25 such that the lower portion of the sheet 23 (i.e. the lower sheet 32) is located in front of the lower backing portion 30 and the flap 37 is located behind the lower backing portion 30. FIG. 7 illustrates one lower backing portion 30 in an exploded position, and the other lower backing portion 30 received in the associated piece of material 23. The lower backing portions 30 of FIG. 7 are shaded for illustrative purposes. In particular, for the lower backing portion 30 that is shown received in the associated piece of material 23, the portions of the lower backing portion 30 located behind the piece of material 23 are not shaded to illustrate that the unshaded portions are located behind the piece of material 23, even though the sheet of material 23 is preferably transparent.

After the lower backing portion 30 is passed through the slit 25, the lower backing portion 30 and piece of material 23 may then be coupled to the upper backing portion 20. The piece of material 23 (which forms or includes the upper 22 and lower 32 sheets) may then be coupled to the upper 20 and lower 30 backing portions, preferably by welding or stitching along the sides and bottom of the piece of material 23. Alternately, the piece of material 23 may be coupled to the upper backing portion 20 before the lower backing portion 30 is slid through the slit 25. If the sleeve 10 is two-sided, a piece of material 23' (FIG. 7) and associated lower backing portion 30' may then be coupled to the opposite side of the upper backing portion 20 in the same manner described above.

Figure 8:
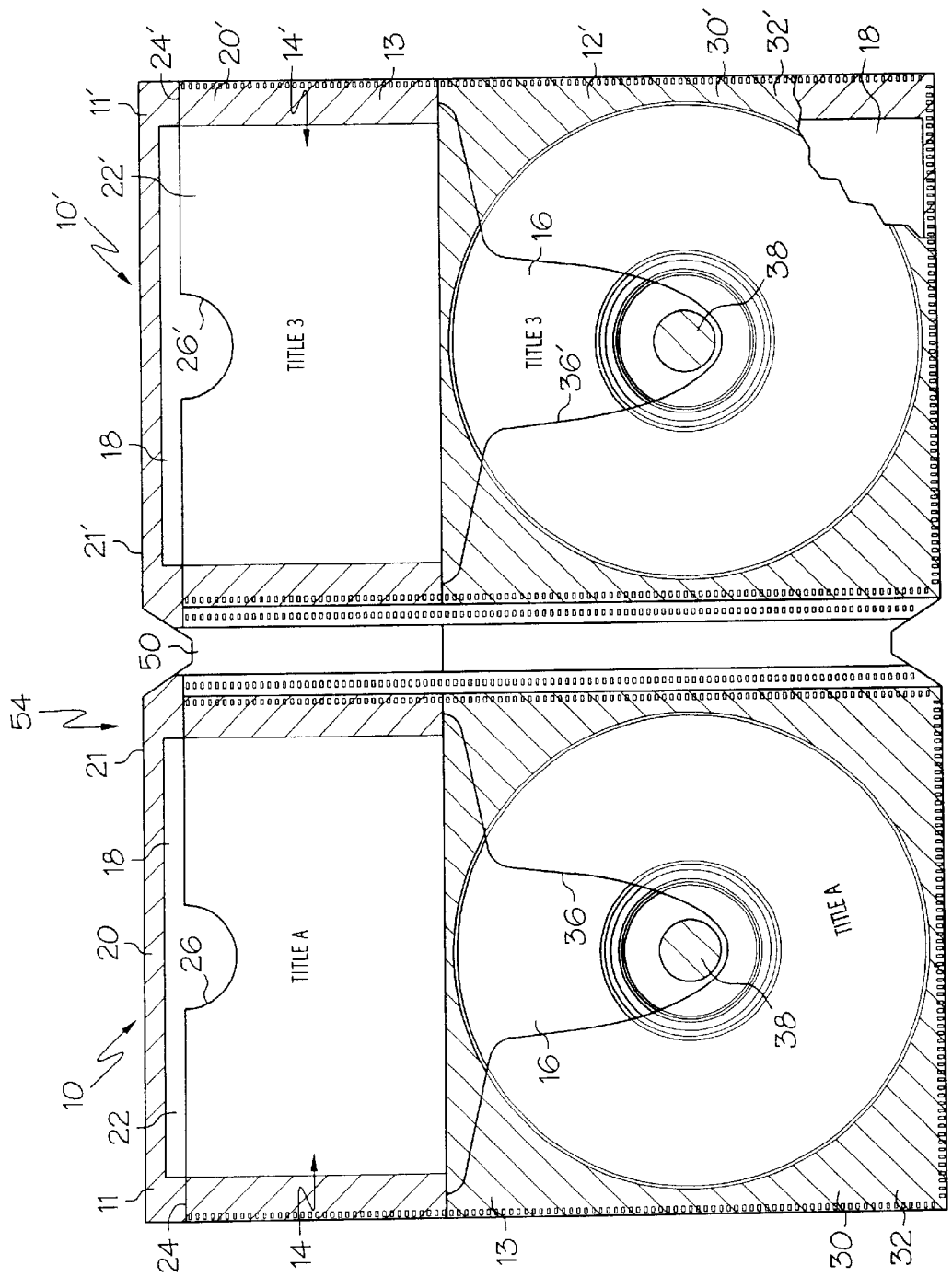
FIG. 8 is a front view of folder including a pair of sleeves, with the upper and lower backing portions being shaded differently to show the arrangement of those components.
Figure 9:
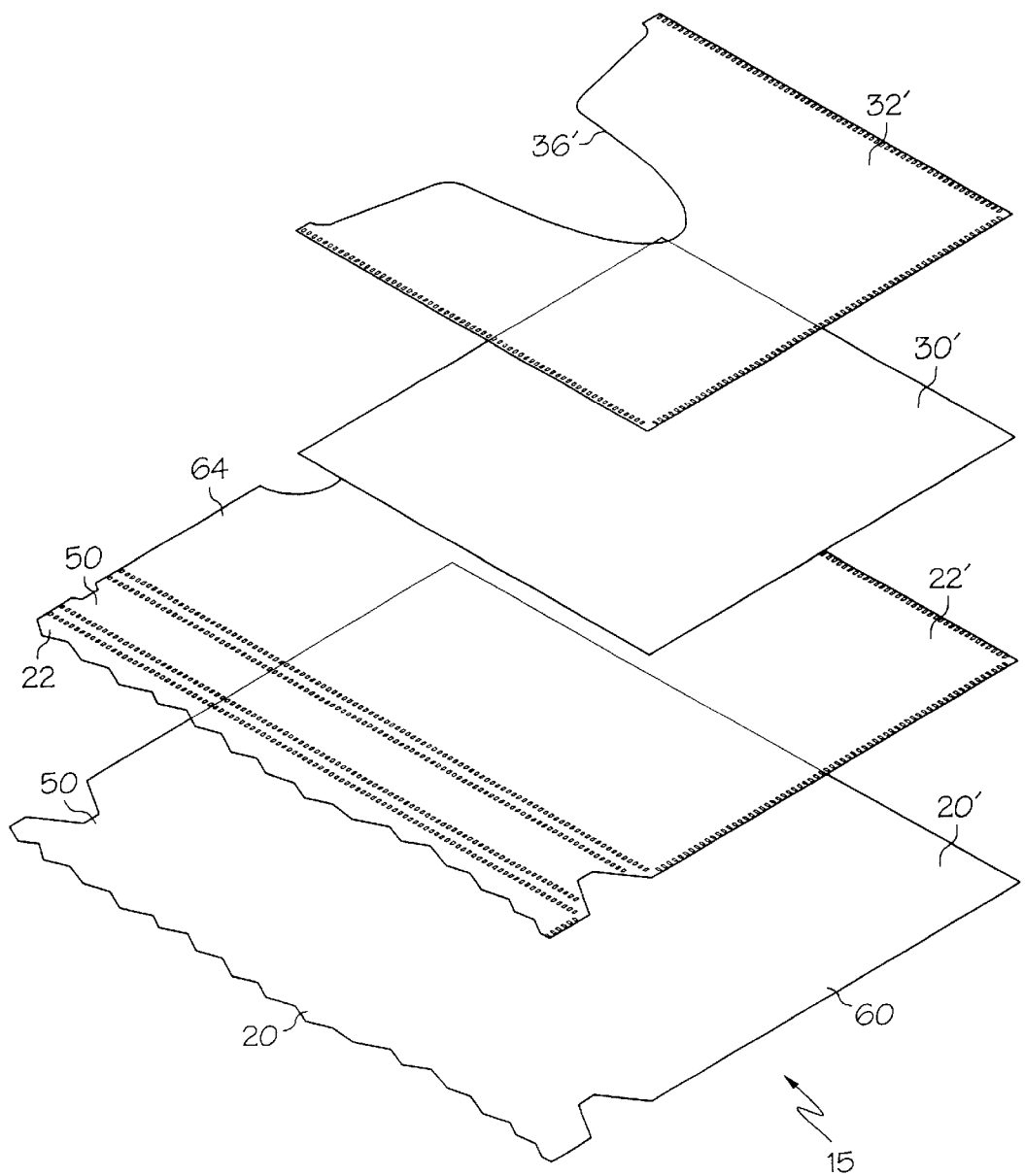
FIG. 9 is an exploded view of part of the folder of FIG. 8.

As shown in FIGS. 8 and 9, a pair of sleeves 10, 10' may be joined together along a common flexible spine portion 50 to form a folder 54. In this case, both sleeves 10, 10' maybe essentially identical to the sleeve 10 shown in FIGS. 1–7 as described above. However, in the embodiment of FIGS. 8 and 9, the backing portions 20, 20' of both the sleeves 10, 10', and the spine portion 50 may be made of a single, common piece of material 60 (see FIG. 9), although the spine portion 50 and the backing portions 20 of the sleeves 10, 10' may also be made of separate pieces of material. Similarly, the upper sheet 22 and upper sheet 22' of the sleeves 10, 10' may also be made from a single piece of material 64, or from separate pieces (not shown). Finally, the lower backing portion 30 and lower backing portion 30' may be made from separate or single pieces of material, and the lower sheet 32 and lower sheet 32' may be made from a separate or single pieces of material.

The folder 54 is preferably two-sided; that is, both sides 13, 15 of the folder 54 include a pair of opposed sleeves for a total of four sleeves, with each sleeve having an upper 14 and lower 12 pocket. In this case, each folder 54 can receive a total of four DVDs 16 and associated labels 18. When the folder 54 is two-sided, the backing portions 20, 20' and spine portion 50 can serve as the backing portions and spine for both sides of the folder. Furthermore, although FIG. 9 illustrates the sheets 22', 32' as separate sheets, the sheets 22', 32' may instead be formed from a single piece of material 23, similar to the embodiment illustrated in FIGS. 6 and 7.

In order to bind the folder 54 into a binder 44, a plurality of folder 54 are aligned and stacked on top of each other, and their spine portions 50 are coupled to the spine of the binder 44. In this manner, manufacturing a folder 54 and mounting the folder 54 into the binder 44 enables greater number of sleeves 10, 10' to be manufactured and mounted at a time.

Of course, the number of pockets 12, 14 formed on any one sleeve 10 can be varied as desired. For example, although the sleeve 10 is illustrated in FIGS. 1–9 as including a single lower 12 and upper 14 pocket one each side of the sleeve 10, each side of the sleeve can include two or more sets of pocket 12, 14 arranged in a side-by-side arrangement, an up-and-down arrangement, or various other arrangements. For example, the sleeve may include a side upper pocket located adjacent to the upper pocket 12, and a side lower pocket located adjacent to the lower pocket 14, with the side upper and lower pockets having the same arrangement of the pockets 12, 14 described and illustrated herein.

Having described the invention in detail and by reference to the preferred embodiments, it will be apparent that modifications and variations thereof are possible without departing from the scope of the invention.

What is claimed is:

1. A sleeve for storing a digital disc and associated documentation comprising:
   a generally rectangular backing portion having a first side and a second side and a height;
   a transparent, generally rectangular upper sheet having an upper edge, a lower edge and two side edges, said upper sheet extending about the entire height of the backing portion, said upper sheet being welded to said backing portion along said lower edge and two side edges to form a storage area coupled to said first side of said backing portion, said storage area and being sized and shaped to receive said documentation therein; and
   a lower backing portion covering a lower portion of said upper sheet and welded to said upper sheet;
   a transparent lower sheet having an upper edge, a lower edge and two side edges, said lower sheet covering said lower backing portion, said lower sheet being welded to said upper sheet along said lower sheet lower edge and two side edges to form a pocket sized and shaped to closely receive said digital disc therein.

2. The sleeve of claim 1 wherein said storage area and said pocket are arranged such that at least part of said documentation is visible when said documentation is received in said storage area and at least part of said digital disc is visible when said digital disc is received in said pocket.

3. The sleeve of claim 1 wherein said lower sheet includes a generally U-shaped recess formed in an upper edge thereof.

4. The sleeve of claim 1 wherein said lower backing portion is non-woven fabric.

5. The sleeve of claim 1 further comprising a rear storage area coupled to said second side of said backing portion, said rear storage area being sized and shaped to receive said documentation therein, and a rear pocket coupled to said rear storage area, said rear pocket being sized and shaped to closely receive a digital disc therein.

6. The sleeve of claim 1 wherein said backing portion includes a generally flexible spine portion.

7. The sleeve of claim 1 wherein said pocket is shaped and sized to closely receive a digital video disc having a diameter of about 4¾ inches therein.

8. The sleeve of claim 1 wherein said storage area and said pocket each have a width and a height, the widths of said storage area and said pocket being approximately equal, the height of said storage area being greater than the height of said pocket.

9. The sleeve of claim 1 further comprising means for coupling said sleeve to a binding mechanism, said coupling means being coupled to said body.

10. The sleeve of claim 1, wherein said coupling means includes a spine including a plurality of spaced holes formed therein.

* * * * *